United States Patent [19]

van der Schoot

[11] Patent Number: 4,739,965
[45] Date of Patent: Apr. 26, 1988

[54] APPARATUS FOR DISCHARGING DIRTY LIQUID FROM A VESSEL UNDER PRESSURE, AS WELL AS A GRID-CONTAINING VESSEL COMPRISING SUCH AN APPARATUS

[75] Inventor: Peter W. C. van der Schoot, AG Groot-Ammers, Netherlands

[73] Assignee: Goudsche Machinefabriek B.V., CA Gouda, Netherlands

[21] Appl. No.: 941,513

[22] Filed: Dec. 12, 1986

Related U.S. Application Data

[63] Continuation of Ser. No. 705,581, Feb. 26, 1985, abandoned.

[30] Foreign Application Priority Data

Feb. 29, 1984 [NL] Netherlands ............... 8400650

[51] Int. Cl.<sup>4</sup> .................. F16K 47/04; F16K 1/34
[52] U.S. Cl. .................... 251/118; 251/121; 251/356; 251/360; 251/144
[58] Field of Search .............. 251/360, 361, 63.5, 251/121, 118, 356, 144

[56] References Cited

U.S. PATENT DOCUMENTS

| 721,453 | 2/1903 | Lunken | 251/360 X |
|---|---|---|---|
| 1,852,233 | 4/1932 | Dailey | 251/118 X |
| 2,727,530 | 12/1955 | Grove et al. | 251/63.5 X |
| 4,337,788 | 7/1982 | Seger | 251/360 X |

FOREIGN PATENT DOCUMENTS 709885 1/1980 U.S.S.R. .............. 251/63.5

Primary Examiner—Arnold Rosenthal
Attorney, Agent, or Firm—Sprung Horn Kramer & Woods

[57] ABSTRACT

An apparatus for discharging dirty liquid from a vessel under pressure, comprising a valve body having a supply and discharge opening, said body accommodating a valve having a stem extending beyond said valve body and adapted for coaction with a central seat having a discharge opening. Said stem is further connected to, or integral with, the piston rod of a piston-and-cylinder assembly arranged in alignment with said stem. Said valve body, stem and seat are designed and arranged within the valve body in such a manner that the fluid to be discharged can flow from all sides radially inwardly towards the discharge opening.

6 Claims, 1 Drawing Sheet

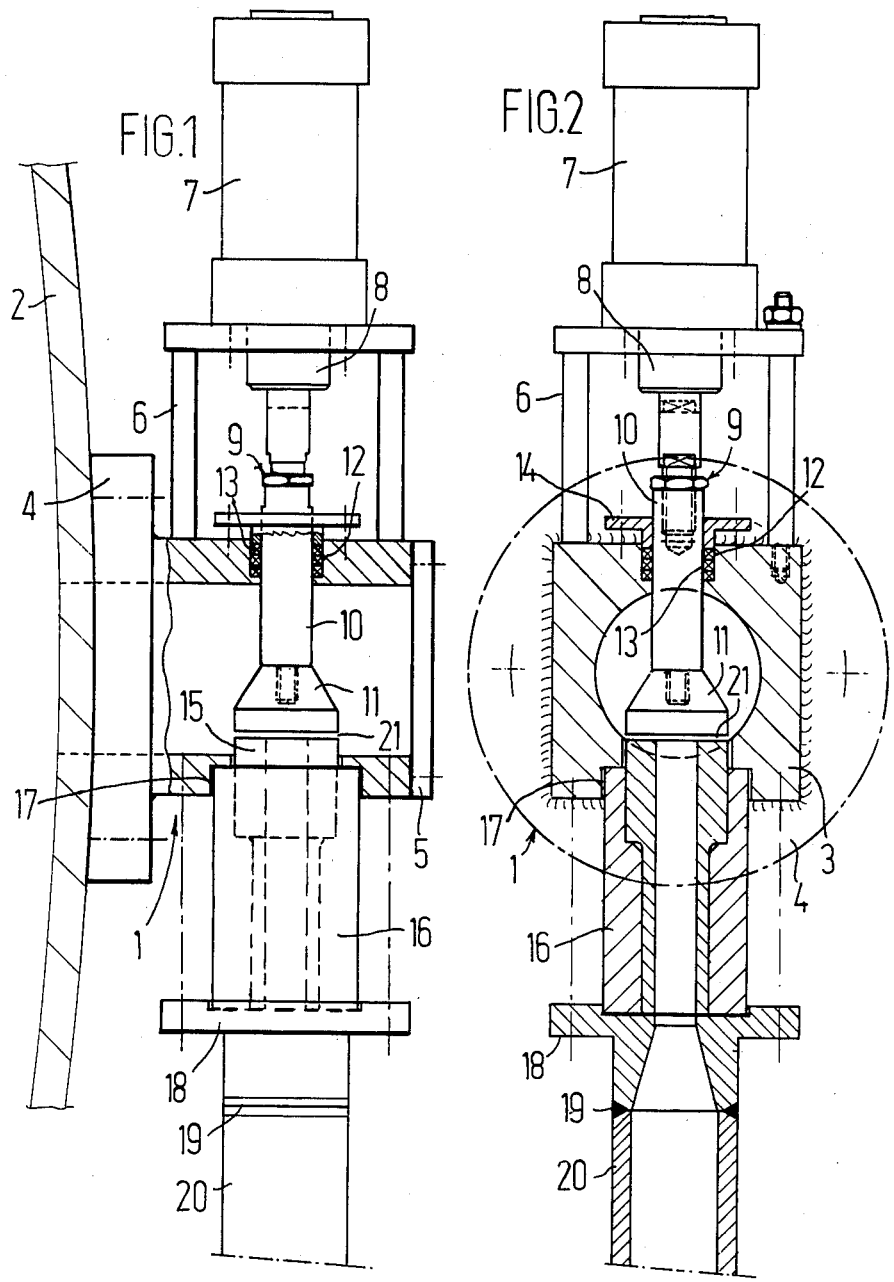

APPARATUS FOR DISCHARGING DIRTY LIQUID FROM A VESSEL UNDER PRESSURE, AS WELL AS A GRID-CONTAINING VESSEL COMPRISING SUCH AN APPARATUS

This application is a continuation of application Ser. No. 705,581, filed 2/26/85, now abandoned.

The present invention relates to an apparatus for discharging dirty liquid from a vessel under pressure, comprising a valve body having a supply and discharge opening, a valve arranged in said valve body, said valve including a stem extending beyond said body and adapted for coaction with a seat having a central discharge opening, said stem being furthermore connected to, or integral with, the piston rod of a piston-and-cylinder assembly aligned with said stem.

In a similar apparatus disclosed in applicants' Dutch patent application No. 82.00348 and in the corresponding European patent application no. 85,467, laid open to public inspection on Aug. 10, 1983, the valve is needle-shaped, and inflow takes place in alignment with the valve displacement device. It is thus achieved that any solid particles present in the dirty liquid are easily reduced in size, so that a further discharge is possible without the risk of clogging.

This prior art apparatus, however, has been found unsuitable in practice for discharging dirty liquid, such as condensate, from e.g. a peeling vessel. The reason is that as a result of the dirt, consisting of sand and the like, everything wears away very quickly. For instance, it has been found in practice that when this apparatus is used in a continuously operating peeling vessel, the apparatus has to be replaced already within one day.

It is an object of the present invention to remove the above drawback.

To this end, an apparatus of the above described type is characterized in that the valve body, the valve stem and the valve seat are designed and arranged in the valve body in such a manner that the fluid to be discharged can flow from all sides radially inwardly towards the discharge opening.

It is thus achieved that the energy produced as a result of the large pressure difference in the gap between the stem and the seat in the fluid is dissipated adjacent the entry of the discharge opening, thereby minimizing the problems resulting from wear.

In this arrangement, the leading end of the stem is advantageously flat and adapted for coaction with the flat front face of the seat, said valve body and said fluid supply opening having such ample dimensions as to ensure an inflow from all sides.

The valve body supply opening may be perpendicular to, and the valve body discharge opening in alignment with, the valve stem axis, so that an apparatus is obtained that can be easily mounted on the under-side of a pressure vessel and which, moreover, occupies little space.

In a further elaboration of the present invenion, the valve stem essentially consists of a valve needle holder provided with a valve needle at the end proximal to the valve seat, so that in case of wear the valve needle needs to be replaced only.

Similarly, the valve seat may be accommodated in a valve seat holder removably attached to the wall of the valve body, enabling an easy replacement of the valve seat.

In order to prevent leakages, the valve seat has a length at least equal to that of the valve seat holder.

Furthermore, the end of the valve seat proximal to the valve stem may have a larger cross-section than the seat end remote from the stem.

The present invention also relates to a grid containing pressure or peeling vessel comprising an apparatus as described above, said vessel being characterized in that the grid openings are smaller than the diameter of the discharge opening through the valve seat, thereby achieving that no objects are supplied to the discharge apparatus that could cause clogging of the apparatus.

One embodiment of the apparatus according to the present invention for discharging dirty liquid from a vessel under pressure will now be described, by way of example, with reference to the accompanying drawings, in which:

FIG. 1 is a diagrammatic, partly cross-sectional side view of a fluid discharge apparatus attached to a peeling vessel and FIG. 2 is a partly cross-sectional, partly elevational side view of the apparatus shown in FIG. 1.

As shown in the drawings, an apparatus generally indicated at 1 for discharging dirty liquid from a vessel 2 under pressure comprises a valve body 3 having a flange 4 by means of which the body is attached e.g. by means of screws, not shown, to the wall 2 of the peeling vessel having an opening, not further indicated. The body is provided with a cover 5 at the end remote from the peeling vessel. On the outer side of the body 3, there is mounted a piston-and-cylinder assembly 7 by means of a mounting yoke 6. These parts will not be further described herein, since they entirely correspond with those described in the prior Dutch patent application 82.00348 and the corresponding European patent application 83 299 168.9, laid open to public inspection on Aug. 10, 1983, under no. 85 467.

A projecting coupling sleeve 8, which is connected on the one end to the piston rod of the piston-and-cylinder assembly 7, which sleeve can be compared with the coupling sleeve 26 in the prior apparatus, is fixedly connected to a valve needle holder 10 by means of a removable connection 9 known per se and hence not further described herein. The valve needle holder is provided at its underside with a removable valve needle 11 connected thereto.

In order that the valve needle holder may be sealed relatively to the wall of the valve body 3, the passage in the wall is provided with a recess 12 containing a stuffing box packing 13, which is retained by a packing gland 14.

As shown in the drawings, diametrically opposite the valve needle the valve body has a valve seat 15 received in a valve seat holder 16 partly disposed in a recess 17 of the wall of the body. The valve seat holder 16 is retained at the side opposite the wall of the body by a connecting piece 18 connected e.g. through bolts, not shown, to the body 3. The connecting piece 18 connects to a discharge pipe 20 connected thereto by means of a weld 19.

As further shown in the drawings, the top of the valve seat has a considerably larger diameter than its bottom. The reason is that the risk of wear adjacent the print of inflow is considerably higher than downstream thereof, where a boundary layer is built up in the fluid flowing at that location.

The drawings show the apparatus according to the present invention in the operative position, i.e. an adjustable slot 21 is provided between the coacting faces of the valve needle 11 and the valve seat 15. The means for adjusting the slot width are extensively described in the above Dutch and European patent applications, so that a description thereof can be dispensed with.

As further shown in the drawings, the connecting piece is diverging in downstream direction, so that clogging can be prevented.

It will be clear that the apparatus is provided at the required places with sealing rings, not further shown, and with similar features known for the proper operation of the apparatus.

Naturally, modifications are possible within the scope of the present invention.

The apparatus according to the present invention has the great advantage that due to the amply proportioned inner space of the valve body 3 relatively to the valve needle and the valve seat, an inflow from all sides of the dirty liquid to be discharged through the slot 21 is possible. This will result in the dissipation of the kinetic energy produced by the pressure differential across the apparatus in the slot 21 in the liquid before entry in the discharge opening in the valve seat: owing to this, there will be minimal wear. A further contribution to this latter is made by making the valve needle 11 and the valve seat 15 of hard metal or the like.

The chosen design of the valve and the valve seat enables a rapid replacement of vital parts, so that shutdown periods and hence losses of production are minimized.

What is claim is:

1. In an apparatus for discharging abrasive liquid from a vessel under pressure, comprising a valve body having a supply opening for receiving the dirty liquid and a discharge opening and a valve arranged in said valve body, said valve having a valve seat with a central discharge opening in communication with the valve body discharge opening and a stem with a valve closure member connected thereto and facing the valve seat and means for disposing the closure member at a given distance from the valve seat to define an operating position to effect discharge of the dirty liquid, the improvement wherein: the valve seat and the valve closure member each have a single flat surface facing each other and having substantially the same diameter, wherein the diameter of the flat surfaces of the valve seat and the closure member is substantially greater than the diameter of the valve seat discharge opening and wherein an annular region between the valve seat discharge opening and the circumference of the flat surface of the valve seat and the closure member is unobstructed in a radially outward direction in the plane of the valve seat single surface and substantially greater in length than the given distance between the flat surfaces of the valve seat and valve closure member, whereby a radial inflow to the valve seat discharge opening with a dissipation of kinetic energy will be obtained.

2. An apparatus according to claim 1, wherein the valve body supply opening is perpendicular to, and the valve body discharge opening is in alignment with, the valve stem.

3. An apparatus according to claim 1, wherein the valve seat is received in a valve seat holder removably attached to the wall of the valve body.

4. An apparatus according to claim 3, wherein the valve seat has a length at least equal to that of the valve seat holder.

5. An apparatus according to claim 3, wherein the end of the valve seat proximal to the valve closure member has a larger cross-sectional area than the end of the valve seat remote from the valve closure member.

6. An apparatus according to claim 1, wherein the apparatus is a peeling apparatus.

* * * * *